United States Patent [19]

Mayer et al.

[11] Patent Number: 5,962,585
[45] Date of Patent: *Oct. 5, 1999

[54] AQUEOUS CREAMS OF ORGANOSILICON COMPOUNDS FOR HYDROPHOBICIZING BUILDING MATERIALS

[75] Inventors: Hans Mayer; Ingeborg König-Lumer, both of Burghausen; Albert Hausberger, Kienberg, all of Germany

[73] Assignee: Wacker-Chemie GmbH, Germany

[ * ] Notice: This patent is subject to a terminal disclaimer.

[21] Appl. No.: 08/866,965

[22] Filed: Jun. 2, 1997

[30] Foreign Application Priority Data

Jul. 11, 1996 [DE] Germany ............. 196 28 035

[51] Int. Cl.⁶ ............. C08L 83/06; C08L 83/08
[52] U.S. Cl. ............. 524/837; 524/838; 106/287.11; 106/287.16
[58] Field of Search ............. 524/837, 838; 106/287.11, 287.16

[56] References Cited

U.S. PATENT DOCUMENTS

| | | | |
|---|---|---|---|
| 4,076,868 | 2/1978 | Roth et al. | 427/348 |
| 4,247,330 | 1/1981 | Sanders, Jr. | 106/3 |
| 4,757,106 | 7/1988 | Mayer et al. | 524/262 |
| 5,039,724 | 8/1991 | Demlehner et al. | 524/267 |
| 5,196,054 | 3/1993 | Schmuck et al. | 106/2 |
| 5,226,954 | 7/1993 | Suzuki | 106/2 |
| 5,281,657 | 1/1994 | Mautner et al. | 524/745 |
| 5,399,191 | 3/1995 | Mayer et al. | 106/287.11 |
| 5,466,746 | 11/1995 | Geck et al. | 524/837 |
| 5,712,343 | 1/1998 | Geck et al. | 524/837 |

FOREIGN PATENT DOCUMENTS

| | | |
|---|---|---|
| 0476452 | 3/1992 | European Pat. Off. . |
| 4242445 | 6/1994 | Germany . |
| 4335077 | 4/1995 | Germany . |
| 9219671 | 11/1992 | WIPO . |
| WO95/25706 | 9/1995 | WIPO . |
| 9635652 | 11/1996 | WIPO . |

OTHER PUBLICATIONS

Database WPI Section Ch, Week 8350, Derwent Publ. Ltd., London, GB; Class A93 (#83–843080).
Derwent Abstract corresponding to De 43 35 077 (#95–156083).

*Primary Examiner*—Randy Gulakowski
*Assistant Examiner*—Caixia Lu-Rutt
*Attorney, Agent, or Firm*—Brooks & Kushman P.C.

[57] ABSTRACT

Aqueous, stiff cream comprising;
(A) a silicone compound selected from the group consisting of
  (A1) a $C_1$–$C_{20}$-alkyl-$C_2$–$C_6$-alkoxysilane and
  (A2) an alkoxy-containing organopolysiloxane, optionally
(B) an organopolysiloxane which, in addition to other organosiloxane units, contains siloxane units which contain radicals bonded via SiC and containing basic nitrogen, with the proviso that the amine number of the organopolysiloxane is at least 0.01, and
(C) an emulsifier.

18 Claims, No Drawings

AQUEOUS CREAMS OF ORGANOSILICON COMPOUNDS FOR HYDROPHOBICIZING BUILDING MATERIALS

BRIEF SUMMARY OF THE INVENTION

The present invention relates to aqueous creams of organosilicon compounds, to their preparation, and to their use.

BACKGROUND OF THE INVENTION

Organosilicon compounds are used in building protection principally owing to their excellent impregnation action against water and dirt. Aqueous emulsions of organosilicon compounds are environmentally friendly and physiologically tolerated.

A problem with emulsions is that they tend to drip during overhead work. If deep impregnation of vertical surfaces of building materials is desired, the aqueous emulsions must be applied in a number of coats, since they run if applied too thickly by brushing or spraying.

Furthermore, undesired aerosols form during spray application of the emulsions. Building material surfaces which have been cleaned with water must be dried so that the emulsions can penetrate to an adequate extent.

Siloxane or silane compositions containing mineral thickeners can be applied as a thicker layer to the building materials. The siloxane or silane penetrates into the building material, leaving the thickener behind on the surface of the building material. U.S. Pat. No. 4,076,868 describes solutions of methylolysiloxane in toluene which have been thickened by means of silicon dioxide having a surface area of at least 50 m²/g; these solutions are used for rendering building materials water repellent. These solutions are neither environmentally friendly nor physiologically tolerated.

WO 95/25706 describes the rendering of mineral building materials water repellent by means of a gelatinous composition containing silanes and/or siloxanes and a layered mineral, such as bentonite or montmorillonite.

A disadvantage of compositions containing mineral thickeners is the need for subsequent removal of the layered mineral, which must be carried out thoroughly in order to avoid discoloration of the building materials. The thickener must also be disposed of. Furthermore, the penetration depth of the silanes and siloxanes is limited, since the thickener can block the capilliaries in the building material.

DETAILED DESCRIPTION OF THE INVENTION

The present invention has the object of providing simple-to-use, environmentally friendly, physiologically tolerated preparations of organosilicon compounds with a long shelf life for hydrophobicizing porous building materials and building coatings.

The present invention relates to an aqueous, stiff cream comprising;
(A) a silicone compound selected from the group consisting of
  (A1) a $C_1$–$C_{20}$-alkyl-$C_2$–$C_6$-alkoxysilane and
  (A2) an alkoxy-containing organopolysiloxane,
(B) optionally an organopolysiloxane which, in addition to other organosiloxane units, contains siloxane units which contain radicals bonded via SiC and containing basic nitrogen, with the proviso that the amine number of the organopolysiloxane is at least 0.01, and
(C) an emulsifier.

The term cream means pasty, water-containing preparations which are emulsion systems containing active compound, water and emulsifiers. Creams contain no solids.

The novel aqueous creams penetrate fully into the building material. As a result a beading effect rapidly appears after application. The creams have a particularly long shelf life since they contain no solids to settle.

The above description includes cream embodiments containing mixtures of the individual components (A) (B) and (C). The aqueous creams contain no solvents, but, as a consequence of the preparation, can contain up to 1% by weight of hydrocarbons, based on the total of components (A), if used (B) and (C). The creams preferably contain no organic solvents, such as hydrocarbons. The aqueous creams are therefore easy to wash off nonporous substrates, such as windows, with water. In particular, the tools can easily be cleaned with water.

The aqueous creams are stiff, preferably colorless coatings having a creamy consistency which can be applied by brush, roller or knife coater.

The stiffness of the creams is defined as follows:
The cream is applied to a vertical concrete or sand-lime brick surface in a thickness of 1 mm by spraying or knife coating. The definition of stiffness is that this cream may not run down by more than 5 cm, preferably not more than 1 cm, more preferably not at all, after application before it has been fully absorbed by the substrate.

The $C_1$–$C_{20}$-alkyl-$C_2$–$C_6$-alkoxysilanes (A1) preferably contain 1 or 2 identical or different, optionally halogen-substituted, monovalent $C_1$–$C_{20}$-alkyl radicals bonded via SiC, and the remaining radicals are identical or different $C_2$–$C_6$-alkoxy radicals. Methoxysilanes hydrolyze too rapidly and do not permit an adequate shelf life.

Examples of $C_1$–$C_{20}$-alkyl radicals are the methyl, ethyl, n-propyl, isopropyl, n-butyl, isobutyl, tert-butyl, n-pentyl, isopentyl, neopentyl and tert-pentyl radicals; hexyl radicals, such as the n-hexyl radical; heptyl radicals, such as the n-heptyl radical; octyl radicals, such as the n-octyl radical, and isooctyl radicals, such as the 2,2,4-trimethylpentyl radical; nonyl radicals, such as the n-nonyl radical; decyl radical, such as the n-decyl radical and dodecyl radicals, such as the n-dodecyl radical; cycloalkyl radicals, such as cyclopentyl, cyclohexyl, 4-ethylcyclohexyl and cycloheptyl radicals, norbornyl radicals and methylcyclohexyl radicals.

Examples of halogen-substituted $C_1$–$C_{20}$-alkyl radicals are fluorine-, chlorine-, bromine- and iodine-substituted alkyl radicals, such as the 3,3,3-trifluoro-n-propyl radical, the 2,2,2,2',2',2'-hexafluoroisopropyl radical and the heptafluoroisopropyl radical.

Preference is given to unsubstituted $C_1$–$C_{12}$-alkyl radicals.

Examples of $C_2$–$C_6$-alkoxy radicals are the ethoxy, n-propoxy, isopropoxy, n-butoxy, isobutoxy, sec-butoxy and tert-butoxy radicals; pentyloxy radicals, such as the n-pentyloxy radical, and hexyloxy radicals, such as the n-hexyloxy radical. Ethoxy radicals are preferred.

The alkoxy radicals may be substituted by halogen atoms, but this is not preferred.

The aqueous cream can contain an alkoxy-containing organopolysiloxane (A2) or a mixture of more than one organopolysiloxane. The organopolysiloxanes may additionally contain hydroxyl groups, which facilitate bonding to the building materials.

The organopolysiloxanes (A2) have a maximum viscosity of 2000 mPa.s in order to achieve good distribution over the pore surfaces in the masonry. It is also possible to use organopolysiloxanes having a higher viscosity, up to solid resins, for example methylsilicone solid resins having a molecular weight of from 2000 to 10,000 g/mol and, for example, a glass transition temperature range from 400° to 50° C. However, these must be dissolved in the silanes (A1) before preparation of the novel cream.

Suitable organopolysiloxanes (A2) are those comprising units of the formula

in which
R are identical or different monovalent, optionally halogen-substituted $C_1-C_{20}$-hydrocarbon radicals bonded via SiC,
$R^1$ are identical or different monovalent $C_1-C_6$-alkyl radicals,
x is 0, 1, 2 or 3, on average from 0.8 to 1.8,
y is 0, 1, 2 or 3, on average from 0.01 to 2.0, and
z is 0, 1, 2 or 3, on average from 0.0 to 0.5,
with the proviso that the average sum of x, y and z is at most 3.5.

The organopolysiloxane (A2) has a viscosity of from 10 mPa.s to 50,000 mPa.s, preferably from 50 mPa.s to 5000 mPa.s at 25° C.

Examples of $C_1-C_{20}$-hydrocarbon radicals are the $C_1-C_{20}$-alkyl radicals and halogen-substituted $C_1-C_{20}$-alkyl radicals mentioned above under the organoalkoxysilanes (A1), alkenyl radicals, such as vinyl, allyl, n-5-hexenyl, 4-vinylcyclohexyl and 3-norbornenyl radicals; aryl radicals, such as the phenyl, biphenylyl, naphthyl, anthryl and phenanthryl radicals; alkaryl radicals, such as o-, m- and p-tolyl radicals, xylyl radicals and ethylphenyl radicals; aralkyl radicals, such as the benzyl radical, and the alpha- and β-phenylethyl radicals. Preference is given to unsubstituted $C_1-C_{12}$-alkyl radicals and the phenyl radical.

Although not shown in the above formula, some of the radicals R may be replaced by hydrogen atoms bonded directly to silicon atoms. However, this is not preferred.

Examples of radicals $R^1$ are the methyl, ethyl, n-propyl, isopropyl, n-butyl, sec-butyl and tert-butyl radicals; pentyl radicals, such as the n-pentyl radical, and hexyl radicals, such as the n-hexyl radical, particular preference being given to ethyl radicals.

x preferably has an average value of from 0.9 to 1.1. y preferably has an average value of from 0.4 to 1.2. z preferably has an average value of from 0.0 to 0.2.

Examples of organopolysiloxanes (A2) are those obtainable by reacting methyltrichlorosilane and optionally a $C_1-C_8$-alkyltrichlorosilane or phenyltrichlorosilane with ethanol, such as the organopolysiloxanes of the empirical formula $CH_3Si(OC_2H_5)_{0.8}O_{1.1}$ or $C_6H_5Si(OC_2H_5)_{0.72}O_{1.14}$.

The organopolysiloxanes (B) optionally used in addition to component (A) are those comprising units of the formula

in which
$R^2$ are identical or different monovalent, optionally halogen-substituted, SiC-bonded $C_1-C_{20}$-hydrocarbon radicals containing no basic nitrogen,
$R^3$ are identical or different monovalent, optionally halogen-substituted, SiC-bonded $C_1-C_{30}$-hydrocarbon radicals containing basic nitrogen, $R^4$ may be identical or different and is a hydrogen atom or $C_1-C_6$-alkyl radicals,
a is 0, 1, 2 or 3,
b is 0, 1, 2 or 3, on average at least 0.05, and
c is 0, 1, 2 or 3,
with the proviso that the average sum of a, b and c is less than or equal to 3, and that the amine number of organopolysiloxane (B) is at least 0.01.

The amine number defines the number of ml of 1N HCl necessary to neutralize 1 g of organopolysiloxane (B). The amine number of the organopolysiloxane (B) is at least 0.1, preferably at least 0.2, and is more preferably at most 8, in particular at most 4.

Examples and preferred examples of the radical $R^2$ are listed above under the radical R. Preference is given to the methyl and isooctyl radicals.

A hydrocarbon radical, in particular a methyl radical, is also preferably bonded to each silicon atom to which a hydrogen atom is bonded.

The radical $R^3$ is preferably a radical of the formula

in which
$R^5$ may be identical or different and is hydrogen or a monovalent, optionally substituted $C_1-C_{10}$-hydrocarbon radical or $C_1-C_{10}$-aminohydrocarbon radical, and
$R^6$ is a divalent $C_1-C_{15}$-hydrocarbon radical.

Examples of the radical $R^5$ are the examples of hydrocarbons given for the radical R and amino-substituted hydrocarbon radicals, such as aminoalkyl radicals, preference being given to the aminoethyl radical.

At least one hydrogen atom is bonded to each nitrogen atom in the radicals of formula (III).

The radical $R^6$ is a divalent hydrocarbon radical having 1 to 10 carbon atoms, preferably 1 to 4 carbon atoms, more preferably the n-propylene radical.

Examples of radicals $R^6$ are the methylene, ethylene, propylene, butylene, cyclohexylene, octadecylene, phenylene and butenylene radicals.

Preferred examples of radicals $R^3$ are
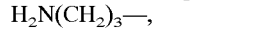
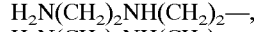
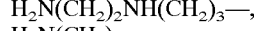
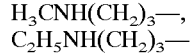
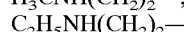
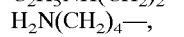
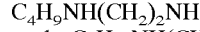
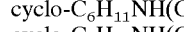
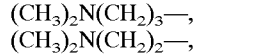
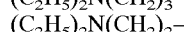
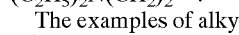 and

The examples of alkyl radicals $R^1$ also apply to the radical $R^6$.

Examples and preferred examples of the radical $R^4$ are given above under the radical $R^1$. Preference is given to the methyl and ethyl radicals.

The average value of a is from 0 to 2, preferably from 0 to 1.8.

The average value of b is from 0.1 to 0.6, preferably from 0.15 to 0.30.

The average value of c is from 0 to 0.8, preferably from 0.01 to 0.6.

The organopolysiloxanes (B) have a viscosity of from 5 to 5000 mPa.s, preferably from 100 to 3000 mPa.s at 25° C.

The organopolysiloxanes (B) can be prepared by equilibration or condensation of aminofunctional silanes with organopolysiloxanes which contain alkoxy groups and/or hydroxyl groups and contain no basic nitrogen.

The aqueous creams contain a known emulsifier (C). Suitable anionic emulsifiers are the following:

1. Alkylsulfates, in particular those having a chain length of from 8 to 18 carbon atoms, alkyl and alkaryl ether sulfates having 8 to 18 carbon atoms in the hydrophobic radical and 1 to 40 ethylene oxide (EO) or propylene oxide (PO) units.
2. Sulfonates, in particular alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may also have been ethoxylated with from 1 to 40 EO units.
3. Alkali metal and ammonium salts of carboxylic acids having 8 to 20 carbon atoms in the alkyl, aryl, alkaryl or aralkyl radical.
4. Phosphoric acid partial esters and alkali metal and ammonium salts thereof, in particular alkyl and alkaryl phosphates having 8 to 20 carbon atoms in the organic radical, alkyl ether and alkaryl ether phosphates having 8 to 20 carbon atoms in the alkyl or alkaryl radical and 1 to 40 EO units.

Suitable nonionic emulsifiers are the following:

5. Polyvinyl alcohol, also containing from 5 to 50%, preferably from 8% to 20%, of vinyl acetate units, having a degree of polymerization of from 500 to 3000.
6. Alkyl polyglycol ethers, preferably those having 8 to 40 EO units and containing alkyl radicals having 8 to 20 carbon atoms.
7. Alkylaryl polyglycol ethers, preferably those having 8 to 40 EO units and containing from 8 to 20 carbon atoms in the alkyl and aryl radicals.
8. Ethylene oxide-propylene oxide (EO-PO) block copolymers, preferably those having 8 to 40 EO or PO units.
9. Products of the addition reaction of alkylamines containing alkyl radicals having 8 to 22 carbon atoms with ethylene oxide or propylene oxide.
10. Fatty acids having 6 to 24 carbon atoms.
11. Alkylpolyglycosides of the formula $R^*-O-Z_o$, in which $R^*$ is a linear or branched, saturated or unsaturated alkyl radical having on average 8–24 carbon atoms, and $Z_o$ is an oligoglycoside radical having on average o=1–10 hexose or pentose units, or mixtures thereof.
12. Natural products and derivatives thereof, such as lecithin, lanolin, saponine and cellulose; cellulose alkyl ethers and carboxyalkylcelluloses whose alkyl groups each contain up to 4 carbon atoms.
13. Linear organo(poly)siloxanes containing polar groups, in particular those containing alkoxy groups having up to 24 carbon atoms and/or up to 40 EO and/or PO groups.

Suitable cationic emulsifiers are the following:

14. Salts of primary, secondary and tertiary fatty amines having 8 to 24 carbon atoms with acetic acid, sulfuric acid, hydrochloric acid and phosphoric acid.
15. Quarternary alkyl- and alkylbenzeneammonium salts, in particular those whose alkyl groups have 6 to 24 carbon atoms, in particular the halides, sulfates, phosphates and acetates.
16. Alkylpyridinium, alkylimidazolinium and alkyloxazolinium salts, in particular those whose alkyl chain has up to 18 carbon atoms, especially the halides, sulfates, phosphates and acetates.

Suitable ampholytic emulsifiers are the following:

17. Amino acids with long-chain substituents, such as N-alkyl-di(aminoethyl)glycine or N-alkyl-2-aminopropionic acid salts.
18. Betaines, such as N-(3-acylamidopropyl)-N,N-dimethylammonium salts containing a $C_8$–$C_{18}$-acyl radical, and alkylimidazoliumbetaines Preferred emulsifiers are nonionic emulsifiers, in particular the alkylpolyglycol ethers mentioned above under 6, the products of the addition reaction of alkylamines with ethylene oxide or propylene oxides mentioned under 9, the alkylpolyglycosides mentioned under 11 and the polyvinyl alcohols mentioned under 5. Preferred polyvinyl alcohols also contain from 5% to 20%, in particular from 10% to 15%, of vinyl acetate units and preferably have a degree of polymerization of from 500 to 3000, in particular from 1200 to 2000.

The total amount of components (A) and (B) in the aqueous creams is from 60% to 95% by weight, preferably from 65% to 90% by weight, especially from 75% to 85% by weight.

The proportion of component (B) in the aqueous creams is from 1% to 20% by weight, preferably from 2% to 15% by weight, especially from 3% to 10% by weight.

The proportion of the emulsifier (C) in the aqueous creams is from 0.1% to 5% by weight, preferably from 0.2% to 2% by weight, especially from 0.3% to 1% by weight. The low requirement for emulsifier (C), which is not a hydrophobicizing active compound, is advantageous.

The aqueous creams can also contain buffer substances which stabilize the pH in the range from 5 to 8, where the alkyltrialkoxysilanes are very resistant to hydrolysis. Suitable buffers are all organic and inorganic acids and bases which are chemically inert toward the remaining constituents of the emulsions, in particular the alkali metal, alkaline earth metal and ammonium salts of carboxylic acids, phosphoric acid, carbonic acid and sulfuric acid. Preference is given to sodium carbonate, sodium hydrogencarbonate, sodium hydrogenphosphate and a mixture of acetic acid and aqueous ammonia solution. The amount of buffer substances is at most 3% by weight, preferably 1% by weight, of the total amount of creams.

In addition to the constituents described above, the aqueous creams may also contain, as additives, fungicides, bactericides, algicides, microbicides, scents, corrosion inhibitors and antifoams. The preferred amount of additives is at most 2% by weight, in particular 0.5% by weight, of the total amount of creams.

The novel aqueous creams are prepared by conventional processes for the preparation of aqueous creams.

In the first step of a preferred process, a readily mobile aqueous emulsion is prepared from at most 20% by weight, preferably at most 15% by weight of the total amount, of components (A) and (B) and the majority of the emulsifier and water. The majority, in particular at least 80% by weight, of component (B) is preferably used, since this also has a surfactant character. At least 80% by weight, preferably at least 90% by weight, of the emulsifier (C) is used in the preparation of the aqueous emulsion.

In a preferred procedure, initially only some, preferably from 5% to 40% by weight, of the water is mixed with the emulsifier (C), component (B) is then emulsified optionally, and finally component (A) is emulsified until a viscous oil phase is formed, and the remaining water is then emulsified in to form a less-viscous emulsion. Components (A) and (B) can also be mixed and added to an emulsion of emulsifier and water.

In the 2nd step of the preferred preparation process, the remaining components (A) and, optionally, (B) are incorporated into the aqueous emulsion until a creamy consistency has been achieved.

Both steps are carried out in pressure emulsification units, colloid mills or preferably in a high-speed stator-rotor stirrer designed by Prof. P. Willems.

The novel aqueous creams are suitable for hydrophobicizing building materials, preferably for subsequent hydrophobicizing impregnation of visible masonry, concrete and/or reinforced concrete.

The thickness in which the novel hydrophobicizing cream is applied is from 0.1 mm to 3 mm, preferably from 0.2 mm to 1.5 mm, more preferably from 0.3 mm to 1.1 mm.

The aqueous creams are furthermore suitable for hydrophobicizing mineral building materials, such as natural or synthetic rock, concrete, cement, sand-lime brick and porous concrete, building materials made from clay minerals, such as clay bricks, as hydrophobicizing and, optionally, binding additives for plaster, rendering and in masonry coatings, such as inorganic pigments, silicone resin emulsion paints and plasters, silicate emulsion paints, emulsion paints, knifing fillers, reinforcing compositions and primers. Preferably, the early rain resistance of building coatings is improved.

The aqueous creams are also suitable for hydrophobicizing finely divided inorganic substances, such as perlite, vermiculite and thermal insulation materials.

The aqueous creams are particularly suitable for hydrophobicizing mineral-bound, preferably cement-bound, fibrous building materials whose fibers consist of natural fibers or synthetic fibers. Suitable natural fibers are mineral fibers, such as rockwool, quartz fibers, ceramic fibers or vegetable fibers, such as cellulose. Examples of suitable synthetic fibers are glass fibers, plastic fibers and carbon fibers. The aqueous cream is preferably used for hydrophobicizing cement-bound cellulose fibrous building parts. The cellulose fibers can be, for example, jute, coconut or hemp fibers or originate from paper, board or wastepaper.

The aqueous creams are also suitable for use in bulk, i.e. the cream is added to a hydraulic mixture for the production of building parts before setting or for hydrophobicizing building parts after setting.

The novel aqueous creams can be diluted with water before use as hydrophobicizing agents and, optionally, binders.

In the examples below, all parts and percentages are by weight, unless otherwise stated. Unless otherwise stated, the examples below are carried out at atmospheric pressure, i.e. at about 0.10 MPa, and at room temperature, i.e. at about 20° C., or at a temperature which becomes established on combining the reactants at room temperature without additional heating or cooling. The active compound content of the aqueous creams is the sum of all organosilicon components.

EXAMPLES

The following are used as Component (A)

H1: Isooctyltriethoxysilane

H2: Organopolysiloxane of the empirical formula $CH_3Si(OC_2H_5)_{0.8}O_{1.1}$ having a mean molecular weight of about 650 g/mol and a viscosity of about 20 mm²/s.

H3: Methylsilicone resin in the form of a highly viscous liquid, comprising $CH_3SiO_{3/2}$ units, with about 20 mol % of $(CH_3)_2SiO_{2/2}$ units and about 10 mol % of $C_2H_5O/SiO_{3/2}$ units and a molecular weight of about 5000 g/mol.

The following are used, optionally, as Component (B)

N1: Product of the condensation of an α,ω-dihydroxymethylpolysiloxane containing one Si-bonded hydroxyl group in each of the terminal units and N-(2-aminoethyl)-3-aminopropyltrimethoxysilane in the presence of KOH, having an amine number of about 0.3, a viscosity of about 1500 mm²/s at 25° C. and a residual methoxy content of less than 5 mol %, based on the methoxy groups initially present in the N-(2-aminoethyl)-3-aminopropyltrimethoxysilane.

N2: Condensation product analogous to N1, but having an amine number of about 0.6 and a viscosity of about 2000 mm²/s at 25° C.

The following are used as Component (C)

E1: Product of the reaction of stearylamine and ethylene oxide, having an alkali number of from 48 to 51 mg of KOH/g.

E2: Isotridecyl alcohol glycol ether containing 10 ethylene oxide units, 80% in water.

Preparation of Novel Aqueous Creams

The novel aqueous creams below are prepared by precharging an aqueous emulsion, optionally having a high content of component (B). In the preparation of the emulsions, initially only some of the water, namely from 5% to 40% by weight, is mixed with emulsifier, and the mixture is emulsified with, optionally, amino-functional polysiloxane (B) followed by component (A). However, it is also possible to precharge all the water. The remainder of component (A) is subsequently incorporated into the emulsion. The incorporation mentioned is carried out in a high-speed stator-rotor stirrer designed by Prof. P. Willems. The compositions are shown below in Table I. The active compound content is the sum of all silicone constituents.

TABLE I

| Aqueous cream | Silane/siloxane/silicone resin [% by wt.] | Aminopolysiloxane [% by wt.] | Emulsifier [% by wt.] | Water [% by wt.] | Active compound content [% by wt.] |
|---|---|---|---|---|---|
| WC 1 | H 1/76.5 | N 1/8.5 | E 1/0.4<br>E 2/0.4 | 14.2 | 85.0 |
| WC 2 | H 1/72 | N 1/8 | E 1/0.4<br>E 2/0.4 | 19.2 | 80.0 |
| WC 3 | H 1/76 | N 1/4 | E 1/0.2<br>E 2/0.2 | 19.6 | 80.0 |
| WC 4 | H 1/66.5<br>H 2/9.5 | N 2/4.2 | E1/0.2<br>E 2/0.2 | 19.4 | 80.2 |
| WC 5 | H 1/57<br>H 2/19 | N 1/4 | E 1/0.2<br>E 2/0.2 | 19.6 | 80.0 |
| WC 6 | H 1/41.8<br>H 2/7.6<br>H 3/26.6 | N 1/4 | E 1/0.2<br>E 2/0.2 | 19.6 | 80.0 |
| WC 7 | H 1/80 | — | E 1/0.2<br>E 2/0.2 | 19.6 | 80.0 |

The novel creams WC 1 to WC 7 are prepared individually as follows:

WC 1: The precharge comprises 67.6 g of emulsion prepared from 34 g of N 1, 1.6 g of each of E 1 and E 2, and 30.4 g of water. 306 g of silane H 1 and 26.4 g of water are then incorporated alternately in 6 portions each in a high-speed stator-rotor stirrer until a white, aqueous cream is obtained.

WC 2: The precharge comprises 64 g of emulsion prepared from 32 g of N 1, 1.6 g of each of E 1 and E 2, and 28.8 g of water. 288 g of silane H 1 and 48 g of water are then incorporated alternately in 6 portions each in a high-speed stator-rotor stirrer until a white, aqueous cream is obtained.

WC 3: The precharge comprises 32 g of emulsion prepared from 16 g of N 1, 0.8 g of each of E 1 and E 2, and 14.4 g of water. 304 g of silane H 1 and 64 g of water are then incorporated alternately in 6 portions each in a high-speed stator-rotor stirrer until a white, aqueous cream is obtained.

WC 4: The precharge comprises 33.5 g of emulsion prepared from 16.8 g of N 2, 0.8 g of each of E 1 and E 2, and 15.1 g of water. A mixture of 266 g of silane H 1 and 38 g of siloxane H 2 and 62.5 g of water are then incorporated alternately in 6 portions each in a high-speed stator-rotor stirrer until a white, aqueous cream is obtained.

WC 5: The precharge comprises 32 g of emulsion prepared from 16 g of N 1, 0.8 g of each of E 1 and E 2, and 14.4 g of water. A mixture of 228 g of silane H 1 and 76 g of siloxane H 2 and 64 g of water are then incorporated alternately in 6 portions each in a high-speed stator-rotor stirrer until a white, aqueous cream is obtained.

WC 6: The precharge comprises 32 g of emulsion prepared from 16 g of N 1, 0.8 g of each of E 1 and E 2, and 14.4 g of water. A mixture of 167.2 g of silane H 1, 30.4 g of siloxane H 2 and 106.4 g of silicone resin H 3 and 64 g of water are then incorporated alternately in 6 portions each in a high-speed stator-rotor stirrer until a white, aqueous cream is obtained.

WC 7: The precharge comprises 32 g of emulsion prepared from 16 g of H 1, 0.8 g of each of E 1 and E 2, and 14.4 g of water. 304 g of silane H 1 and 64 g of water are then incorporated alternately in 6 portions each in a high-speed stator-rotor stirrer until a white, aqueous cream is obtained.

The aqueous creams WC 1 to WC 7 show no evidence of phase separation after storage for 4 weeks at 50° C., nor after storage for 12 months at room temperature. They thus have a long shelf life. All creams have excellent stiffness. Application thicknesses of 1 mm to vertical building material surfaces result in no sagging.

After 24 hours, a very good water beading effect is apparent when the aqueous creams are applied undiluted or when dilutions of the aqueous creams WC 1 to WC 6 having an active compound content of from about 1% to 10% are applied to mineral surfaces. Contact angles of >90° are measured on the treated surfaces. In the case of WC 7, as pure silane cream, this beading effect with contact angles of >90° only appears after a relatively long time.

Preparation of Conventional Nonaqueous Silicone Pastes as Comparative Substances The nonaqueous silicone pastes SG 1 and SG 2 used for comparative purposes were prepared as described in WO 95/25706, Example 4b) and Example 4e). The active compound content is the sum of all silicone constituents.

TABLE II

| Silicone pastes | Silane/ siloxane [% by wt.] | Bentonite [% by wt.] | Solvent ethanol [% by wt.] | Active compound content [% by wt.] |
| --- | --- | --- | --- | --- |
| SG 1 | H 1/85 | 12 | 3 | 85.0 |
| SG 2 | H 1/58 H 2/20 | 19 | 3 | 78.0 |

The silicone pastes which are not in accordance with the invention are prepared individually as follows:

SG 1: 340 g of silane H 1 are mixed with 48 g of bentonite (Bentone® 34) and 12 g of ethanol with the aid of a slow-running stirrer until a relatively high-viscosity, ocher-colored paste is obtained. The paste is stiff. The application in a thickness of 1 mm to a vertical building material surface does not result in sagging.

SG 2: 232 g of silane H 1 and 80 g of siloxane H 2 are mixed with 76 g of bentonite (Bentone® 34) and 12 g of ethanol with the aid of a slow-running stirrer until a relatively high-viscosity, ocher-colored paste is obtained. The paste is stiff.

The application in a thickness of 1 mm to a vertical building material surface results in no sagging whatsoever.

EXAMPLE 1

Hydrophobicizing Agent for Porous Mineral Building Materials

Before application to porous mineral building materials, the novel creams and conventional pastes are stored at 50° C. for 14 days and assessed visually. The symbols shown in Table III below have the following meanings:

+++: no visual change

---: significant separation of silicone liquid

The creams and pastes are applied by brush to sand-lime brick coated with mineral pigment (Purkristallat® silicate pigment from Keimfarben GmbH, Diedorf). After storage at room temperature for 14 days, the discoloration of the coated and hydrophobisized sand-lime brick and the water beading effect are assessed, the latter by measuring the contact angle. Contact angles of >90° denote good beading effects and contact angles of <90° denote poor beading effects. The results are shown in Table III below.

Set concrete specimens are coated with creams and pastes in different application thicknesses. After storage at room temperature for 14 days, the samples are broken. The thickness of the hydrophobic zone at the surface indicates the penetration depth. The water absorption of the concrete drops, and at the same time its hydrophobicity increases, with the penetration depth. The results are shown in Table III below.

The creams and pastes are applied by brush to sand-lime brick. After storage at room temperature for 14 days, the water absorption is assessed by measuring the water absorption coefficient w in accordance with DIN 52617. Values of $w<0.1$ $kg/m^2 \times s^{1/2}$ denote extremely low water absorption.

TABLE III

| Creams/pastes Active compound content [% by wt.] | Shelf life | Discoloration of the treated concrete surface | Beading efffect/contact angle | Application thickness/ penetration depth on concrete | w values | Cleaning behavior*** |
|---|---|---|---|---|---|---|
| WC 1/85.0 | +++ | none | very good/140° | 0.8 mm/16 mm | 0.036 kg/m² × s½ | +++ |
| WC 2/80.0 | +++ | none | very good/130° | 0.5 mm/10 mm | 0.040 kg/m² × s½ | +++ |
| WC 3/80.0 | +++ | none | very good/140° | 0.2 mm/8 mm | 0.030 kg/m² × s½ | +++ |
| WC 4/80.2 | +++ | slight | very good/130° | 0.8 mm/15 mm | 0.048 kg/m² × s½ | +++ |
| WC 5/78.0 | +++ | significant | very good/145° | 0.8 mm/12 mm | 0.052 kg/m² × s½ | +++ |
| WC 6/80.0 | +++ | considerable | very good/128° | 0.2 mm/3 mm | 0.060 kg/m² × s½ | +++ |
| WC 7/80.0 | +++ | none | very good/125° | 0.3 mm/9 mm | 0.035 kg/m² × s½** | --- |
| SG 1/85.0 | --- | pale brown, wax-like* | moderate/50° | 0.8 mm/16 mm | 0.090 kg/m² × s½** | --- |
| SG 2/78.0 | --- | dark brown, very wax-like* | moderate/40° | 0.8 mm/12 mm | 0.120 kg/m² × s½** | --- |

*The wax-like coating with a thickness of about 150 μm could only be removed with great difficulty using a steel brush, and then only with damage to the substrate.
**The wax-like coating was not removed.
***The application tools can easily be cleaned by rinsing with water (+++); the application tools can only be cleaned using organic solvents (---).

EXAMPLE 2
Hydrophobicizing Primer for Mineral Coatings on Mineral Building Materials The novel aqueous cream WC 3 is applied to sand-lime brick at an application rate of 200 g/m². After storage at room temperature for 14 days, the following properties of the hydrophobicized sand-lime brick are measured analogously to Example 1:

Discoloration: none

Beading effect: very good

Contact angle: 140°

Penetration depth: 6 mm w value: 0.035 kg/m²×s$^{1/2}$ sd value: 0.03 m

The sd value was measured in accordance with DIN 52615; sd values of <0.1 m indicate high water vapour permeability, while sd values of >0.1 m indicate reduced water vapor permeabilities.

The sand-lime brick primed in this way and stored for 14 days is coated with silicone resin emulsion paint in accordance with DIN 18363 (the content of organic resins does not exceed the content of organopolysiloxanes). The adhesive strength of the coating is then determined in accordance with ISO 4624 as being 2.9 N/mm². Without the hydrophobicizing primer (with cream WC 4 applied at an application rate of 200 g/m²), the adhesion of this silicone resin paint to sand-lime brick is determined as being only 1.5 N/mm².

The novel aqueous cream WC 5 is stored at 50° C. for 4 weeks, after which there is no visual change. This cream is then applied by brush (200 g/m²) to a fiber-reinforced cement block coated with 2 mm of brittle lime cement plaster and then stored at room temperature for 14 days.

For untreated lime cement plaster, a w value of 1.3 kg/m²×s$^{1/2}$ is found.

The following properties of the lime cement plaster hydrophobicized in this way are found:

Beading effect: very good

Contact angle: 130°

Penetration depth: 2 mm w value: 0.054 kg/m²×s$^{1/2}$

The improved surface strength of the lime cement plaster after application of cream WC 4 is striking.

The substrate treated in this way can be coated with silicone resin emulsion paint as in Example 1. After accelerated Q-UV weathering for 1000 hours, the specimen coated in this way shows no flaking or changes in color whatsoever and retained the very good beading effect.

The novel aqueous cream WC 7 is applied to concrete at an application rate of 300 g/m². After storage at room temperature for 14 days, the following properties of the hydrophobicized concrete sample are measured analogously to Example 1:

Discoloration: none

Beading effect: very good

Contact angle: 125°

Penetration depth: 9 mm w value: 0.035 kg/m²×s$^{1/2}$

The concrete sample primed in this way and stored for 14 days is coated with silicone resin emulsion paint in accordance with DIN 18363 (the content of organic resins does not exceed the content of organopolysiloxanes). The adhesive strength of the coating is then determined in accordance with ISO 4624 as being 2.0 N/mm². Without the hydrophobicizing primer (with cream WC 7 applied at an application rate of 300 g/m²), the adhesion of this silicon resin paint to sand-lime brick is determined as being only 1.3 N/mm².

What is claimed is:

1. An aqueous, stiff cream comprising;
   (A) a silicone compound selected from the group consisting of
      (A1) a $C_1$–$C_{20}$-alkyl-$C_2$–$C_6$-alkoxysilane and
      (A2) a alkoxy-containing organopolysiloxane,
   (B) optionally an organopolysiloxane which, in addition to other organosiloxane units, contains siloxane units which contain radicals bonded via SiC and containing basic nitrogen, with the proviso that the amine number of the organopolysiloxane is at least 0.01, and
   (C) an emulsifier,
wherein the total amount of components (A) and (B) is at least 65% by weight based on the weight of said stiff cream, and
wherein the stiffness of said stiff cream is such that when applied to a vertical concrete surface in a thickness of 1 mm by spraying or knife coating, the cream will not run down the vertical concrete by more than 5 cm before it has been completely absorbed by the concrete.

2. An aqueous cream as claimed in claim 1, in which the $C_1$–$C_{20}$-alkyl-$C_2$–$C_6$-alkoxysilane (A1) contains 1 or 2 identical or different, optionally halogen-substituted, monovalent $C_1$–$C_{20}$-alkyl radicals bonded via SiC, and the remaining radicals are identical or different $C_2$–$C_6$-alkoxy radicals.

3. An aqueous cream as claimed in claim 1, in which the organopolysiloxane (A2) is comprised of units of the formula

(I)

in which

R is an identical or different monovalent, optionally halogen-substituted $C_1$–$C_{20}$-hydrocarbon radical bonded via SiC, $R^1$ is an identical or different monovalent $C_1$–$C_6$-alkyl radical, x is 0, 1, 2 or 3, y is 0, 1, 2 or 3, and z is 0, 1, 2 or 3, with the proviso that the average sum of x, y and z for the organopolysiloxane (A2) is at most 3.5.

4. An aqueous cream as claimed in claim 1, in which the organopolysiloxane (B) is comprised of units of the formula

(II)

in which $R^2$ is an identical or different monovalent, optionally halogen-substituted, SiC-bonded $C_1$–$C_{20}$-hydrocarbon radical containing no basic nitrogen, $R^3$ is an identical or different monovalent, optionally halogen-substituted, SiC-bonded $C_1$–$C_{30}$-hydrocarbon radical containing basic nitrogen, $R^4$ identical or different and is a hydrogen atom or $C_1$–$C_6$-alkyl radical, a is 0, 1, 2 or 3, b is 0, 1, 2 or 3, c is 0, 1, 2 or 3, with the proviso that the average sum of a, b and c for organopolysiloxane (B) is less than or equal to 3, and that the amine number of organopolysiloxane (B) is at least 0.01.

5. An aqueous cream as claimed in claim 1, in which the emulsifier (C) is a nonionic emulsifier selected from the group consisting of alkylpolyglycol ethers, products of the addition reaction of alkylamines with ethylene oxide or propylene oxide, alkylpolyglycosides and polyvinyl alcohol.

6. An aqueous cream as claimed in claim 1, in which the total amount of components (A) and (B) is from 65% to 90% by weight based on the weight of the aqueous cream.

7. An aqueous cream as claimed in any one of claims 1, in which the proportion of the emulsifier (C) is from 0.2% to 2% by weight based on the weight of the aqueous cream.

8. A method for hydrophobicizing building materials and finely divided inorganic substances comprising applying the aqueous cream of claim 1 to said building materials and finely divided inorganic substances.

9. A binder and primer for building coating containing an aqueous cream as claimed in claim 1.

10. An aqueous cream as claimed in claim 3, where x is on average from 0.8 to 1.8, y is on average from 0.01 to 2.0, and z is on average from 0.0 to 0.5 for units of formula (I) in organopolysiloxane (A2).

11. An aqueous, stiff cream comprising:

(A) a silicone compound selected from the group consisting of
(A1) a $C_1$–$C_{20}$-alkyl-$C_2$–$C_6$-alkoxysilane and
(A2) a alkoxy-containing organopolysiloxane, (B) optionally an organopolysiloxane which, in addition to other organosiloxane units, contains siloxane units which contain radicals bonded via SiC and containing basic nitrogen, with the proviso that the amine number of the organopolysiloxane is at least 0.01, and (C) an emulsifier, in an amount of from 0.1 weight percent to 2 weight percent based on the weight of said stiff cream, wherein the stiffness of said stiff cream is such that when applied to a vertical concrete surface in a thickness of 1 mm by spraying or knife coating, the cream will not run down the vertical concrete by more than 5 cm before it has been completely absorbed by the concrete.

12. An aqueous cream as claimed in claim 11, in which the $C_1$–$C_{20}$-alkyl-$C_2$–$C_6$-alkoxysilane (A1) contains 1 or 2 identical or different, optionally halogen-substituted, monovalent $C_1$–$C_{20}$-alkyl radicals bonded via SiC, and the remaining radicals are identical or different $C_2$–$C_6$-alkoxyradicals.

13. An aqueous cream as claimed in claim 11, in which the organopolysiloxane (A2) is comprised of units of the formula

(I)

in which

R is an identical or different monovalent, optionally halogen-substituted $C_1$–$C_{20}$-hydrocarbon radical bonded via SiC, $R^1$ is an identical or different monovalent $C_1$–$C_6$-alkyl radical, x is 0, 1, 2 or 3, y is 0, 1, 2 or 3, and z is 0, 1, 2 or 3, with the proviso that the average sum of x, y and z for the organopolysiloxane (A2) is at most 3.5.

14. An aqueous cream as claimed in claim 11, in which the organopolysiloxane (B) is comprised of units of the formula

(II)

in which $R^2$ is an identical or different monovalent, optionally halogen-substituted, SiC-bonded $C_1$–$C_{20}$-hydrocarbon radical containing no basic nitrogen, $R^3$ is an identical or different monovalent, optionally halogen-substituted, SiC-bonded $C_1$–$C_{30}$-hydrocarbon radical containing basic nitrogen, $R^4$ is identical or different and is a hydrogen atom or $C_1$–$C_6$-alkyl radical, a is 0, 1, 2 or 3, b is 0, 1, 2 or 3, c is 0, 1, 2 or 3, with the proviso that the average sum of a, b and c for organopolysiloxane (B) is less than or equal to 3, and that the amine number of organopolysiloxane (B) is at least 0.01.

15. An aqueous cream as claimed in claim 11, in which the emulsifier (C) is a nonionic emulsifier selected from the group consisting of alkylpolyglycol ethers, products of the addition reaction of alkylamines with ethylene oxide or propylene oxide, alkylpolyglycosides, and polyvinyl alcohol.

16. An aqueous cream as claimed in claim 11, in which the total amount of components (A) and (B) is from 65% to 90% by weight based on the weight of the aqueous cream.

17. A binder and primer for building coating containing an aqueous, stiff cream as claimed in claim 11.

18. An aqueous cream as claimed in claim 13, wherein x is on average from 0.8 to 1.8, y is on average from 0.01 to 2.0, and z is on average from 0.0 to 0.5 for units of formula (I) in organopolysiloxane (A2).

* * * * *